United States Patent
Takahashi et al.

(10) Patent No.: US 9,115,643 B2
(45) Date of Patent: Aug. 25, 2015

(54) CONTROL DEVICE FOR INTERNAL COMBUSTION ENGINE WITH SUPERCHARGER

(75) Inventors: Kiyonori Takahashi, Susono (JP); Shinichi Soejima, Gotenba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 100 days.

(21) Appl. No.: 13/885,606

(22) PCT Filed: Jun. 8, 2011

(86) PCT No.: PCT/JP2011/063164
§ 371 (c)(1),
(2), (4) Date: May 15, 2013

(87) PCT Pub. No.: WO2012/169026
PCT Pub. Date: Dec. 13, 2012

(65) Prior Publication Data
US 2014/0076278 A1    Mar. 20, 2014

(51) Int. Cl.
*F02B 37/12* (2006.01)
*F02D 41/10* (2006.01)
*F02D 23/00* (2006.01)
*F02D 41/00* (2006.01)

(52) U.S. Cl.
CPC ............... *F02B 37/12* (2013.01); *F02D 23/00* (2013.01); *F02D 41/0007* (2013.01); *F02D 2250/21* (2013.01); *Y02T 10/144* (2013.01)

(58) Field of Classification Search
CPC ......... F02D 41/10; F02D 41/12; F02D 41/14; F02D 23/00; F02D 37/00; F02D 41/0002; F02D 2250/18; F02B 37/12; Y02T 10/144

USPC ............... 123/319, 336, 337, 339.12, 339.13, 123/339.28, 344, 350, 478–480, 123/559.1–559.3; 701/100, 102–106, 108, 701/109, 115; 60/605.1
See application file for complete search history.

(56) References Cited

U.S. PATENT DOCUMENTS 5,706,782 A * 1/1998 Kurihara ................. 123/399
2004/0016419 A1 1/2004 Satou et al.
(Continued)

FOREIGN PATENT DOCUMENTS

JP      2004-060479 A    2/2004
JP      2009-068430 A    4/2009
(Continued)

*Primary Examiner* — John Kwon
*Assistant Examiner* — Johnny H Hoang
(74) *Attorney, Agent, or Firm* — Sughrue Mion, PLLC (57) ABSTRACT

The present invention is a proposal relating to cooperative manipulation of an actuator which actively changes a supercharging pressure and a throttle in the case of application of torque demand control to an internal combustion engine with a supercharger. A control device provided by the present invention separately determines a target air quantity for manipulation of the throttle, and a target air quantity for manipulation of the actuator. In more detail, driver required torque which is included in required torque is converted into an air quantity in accordance with a predetermined conversion rule, and the air quantity which is obtained by the conversion is determined by calculation as a reference target air quantity. The reference target air quantity is used as a target air quantity for throttle manipulation, and is also used as a target air quantity for actuator manipulation at a normal time. When a change occurs to the required torque, and the change cannot be realized under the reference target air quantity, a correction target air quantity capable of realizing the change is determined by calculation, and is used as the target air quantity for throttle manipulation.

10 Claims, 7 Drawing Sheets

(56) References Cited

U.S. PATENT DOCUMENTS

2006/0213194 A1* 9/2006 Hasegawa ................. 60/602
2007/0125083 A1* 6/2007 Rollinger et al. ............ 60/605.1
2011/0144885 A1 6/2011 Ohtsuka et al.
2013/0282259 A1* 10/2013 Takahashi et al. ............ 701/103

FOREIGN PATENT DOCUMENTS

JP 2010-053705 A 3/2010
WO 2010/024007 A1 3/2010

* cited by examiner

CONTROL DEVICE FOR INTERNAL COMBUSTION ENGINE WITH SUPERCHARGER

CROSS REFERENCE TO RELATED APPLICATIONS

This application is a National Stage of International Application No. PCT/JP2011/063164, filed on Jun. 8, 2011, the contents of all of which are incorporated herein by reference in their entirety.

TECHNICAL FIELD

The present invention relates to a control device which is a control device for an internal combustion engine with a supercharger, in more detail, an internal combustion engine with a supercharger having an actuator which actively changes a supercharging pressure such as a waste gate valve and a variable nozzle, and controls a cylinder intake air quantity by cooperative manipulation of a throttle and the aforementioned actuator.

BACKGROUND ART

As one of the control methods of internal combustion engines, there is known torque demand control which determines a manipulation variable of each actuator with torque as a control variable. Japanese Patent Application Laid-Open No. 2010-053705 describes one example of the control device which performs torque demand control. The control device, which is described in Japanese Patent Application Laid-Open No. 2010-053705, performs torque control by control of a cylinder intake air quantity by a throttle, and control of ignition timing by an ignition device. In more detail, the control device determines a target air quantity based on required torque, determines a throttle opening from the target air quantity, calculates estimated torque which is realized under optimal ignition timing based on the present throttle opening, and determines the ignition timing based on the ratio of the required torque and the estimated torque.

The required torque for an internal combustion engine includes required torque which is required by a driver via accelerator pedal manipulation (hereinafter, driver required torque), and required torque (hereinafter, control device required torque) which the control devices of a vehicle such as an ECT (Electronic controlled transmission) and a TRC (Traction Control System). The driver required torque is the basis of the required torque, and the control device required torque is added to it in accordance with necessity in vehicle control. These two kinds of required torque clearly differ from each other in the change speed thereof. The driver required torque basically has a signal with a low change speed, which changes at a speed corresponding to the acceleration manipulation of a driver, whereas the control device required torque has a signal with a high change speed, which abruptly changes the torque which is outputted by an internal combustion engine instantly and temporarily.

According to the control device which performs torque demand control as described in Japanese Patent Laid-Open No. 2010-053705, required torque can be realized with high precision even when the control device required torque with a high change speed is included therein. Hereinafter, this point will be described in detail with use of FIGS. 6, 7 and 8.

Figure 6:
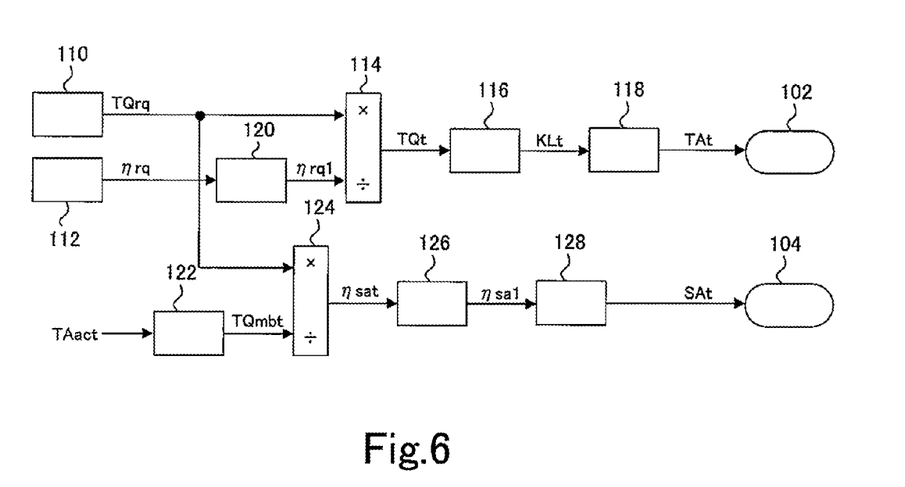
FIG. 6 is a functional block diagram showing a configuration of a control device which performs torque demand control which is conventionally proposed.

FIG. 6 is a functional block diagram showing a configuration of a control device which performs torque demand control which is conventionally proposed. The control device which is described in Japanese Patent Laid-Open No. 2010-053705 is also substantially configured as shown in FIG. 6. The control device shown in FIG. 6 sets a throttle 102 and an ignition device 104 as the objects to be manipulated. The control device includes a required torque determining section 110, a required efficiency determining section 112, an air quantity control target torque calculating section 114, a target torque calculating section 116, a throttle opening calculating section 118, a combustion ensuring section 120, an estimated torque calculating section 122, a target efficiency calculating section 124, a combustion ensuring section 126 and an ignition timing calculating section 128.

In the required torque determining section 110, required torque (TQrq) to the internal combustion engine is determined. The required torque includes driver required torque and control device required torque as described above. In the required efficiency determining section 112, a required efficiency ($\eta$rq) to the internal combustion engine is determined. The required torque and the required efficiency are inputted in the air quantity control target torque calculating section 114. In the air quantity control target torque calculating section 114, air quantity control target torque (TQt) is calculated by dividing the required torque by the required efficiency. However, concerning the required efficiency, a required efficiency ($\eta$rq1) which is processed in the combustion ensuring section 120 is inputted in the air quantity control target torque calculating section 114. In the combustion ensuring section 120, the minimum value of the required efficiency which is used in calculation of the air quantity control target torque is restricted by a combustion limit guard. The air quantity control target torque is inputted in the target air quantity calculating section 116, and is converted into a target air quantity (KLt) with use of a torque-air quantity conversion map. The target air quantity is inputted in the throttle opening calculating section 118, and is converted into a target throttle opening (TAt) with use of an air inverse model. The throttle 2 is operated in accordance with the target throttle opening.

In the estimated torque calculating section 122, calculation of estimated torque (TQmbt) based on a present throttle opening (TAact) is performed. The estimated torque is inputted in the target efficiency calculating section 124 together with the required torque which is determined in the required torque determining section 110. In the target efficiency calculating section 124, a ratio of the required torque to the estimated torque is calculated as a target efficiency ($\eta$sa) for controlling ignition timing. The target efficiency is processed in the combustion ensuring section 126, and a target efficiency ($\eta$sa1) after processing is inputted in the ignition timing calculating section 128. In the combustion ensuring section 126, the minimum value of the target efficiency which is used in calculation of the ignition timing is restricted by the combustion limit guard. The value of the combustion limit guard which is set in the combustion ensuring section 126 for the required efficiency is the same value as the value of the combustion limit guard which is set in the combustion ensuring section 120 for the target efficiency. In the ignition timing calculating section 128, target ignition timing (SAt) is calculated based on the target efficiency. The ignition device 4 is manipulated in accordance with the target ignition timing. The target ignition timing is set at optimal ignition timing when the value of the target efficiency is 1, and as the value of the target efficiency is smaller than 1, the target ignition timing is retarded more from the optimal ignition timing.

Figure 7:
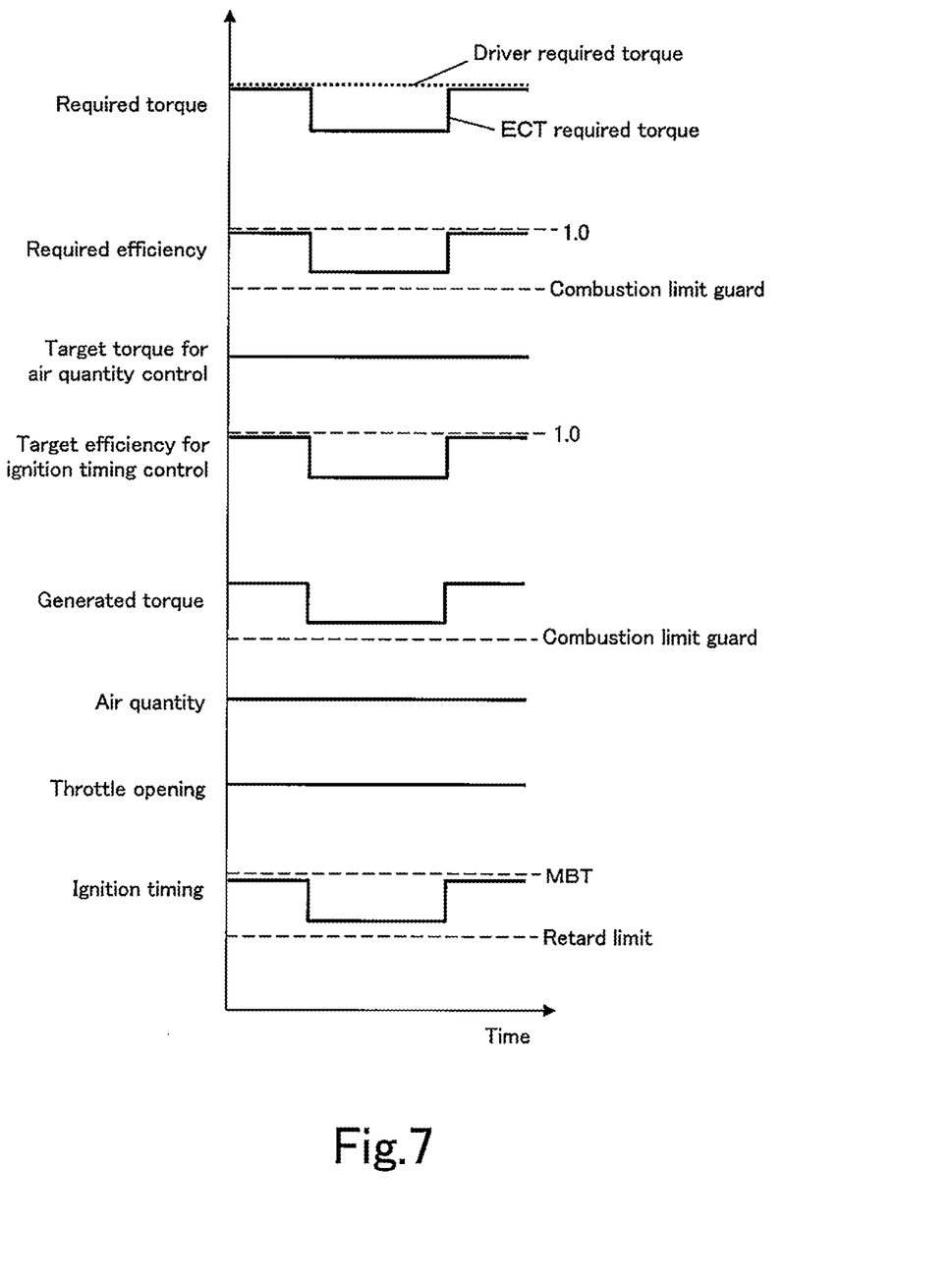
FIG. 7 is a chart showing an operation of an internal combustion engine which is realized by the control device of the configuration shown in FIG. 6.
Figure 8:
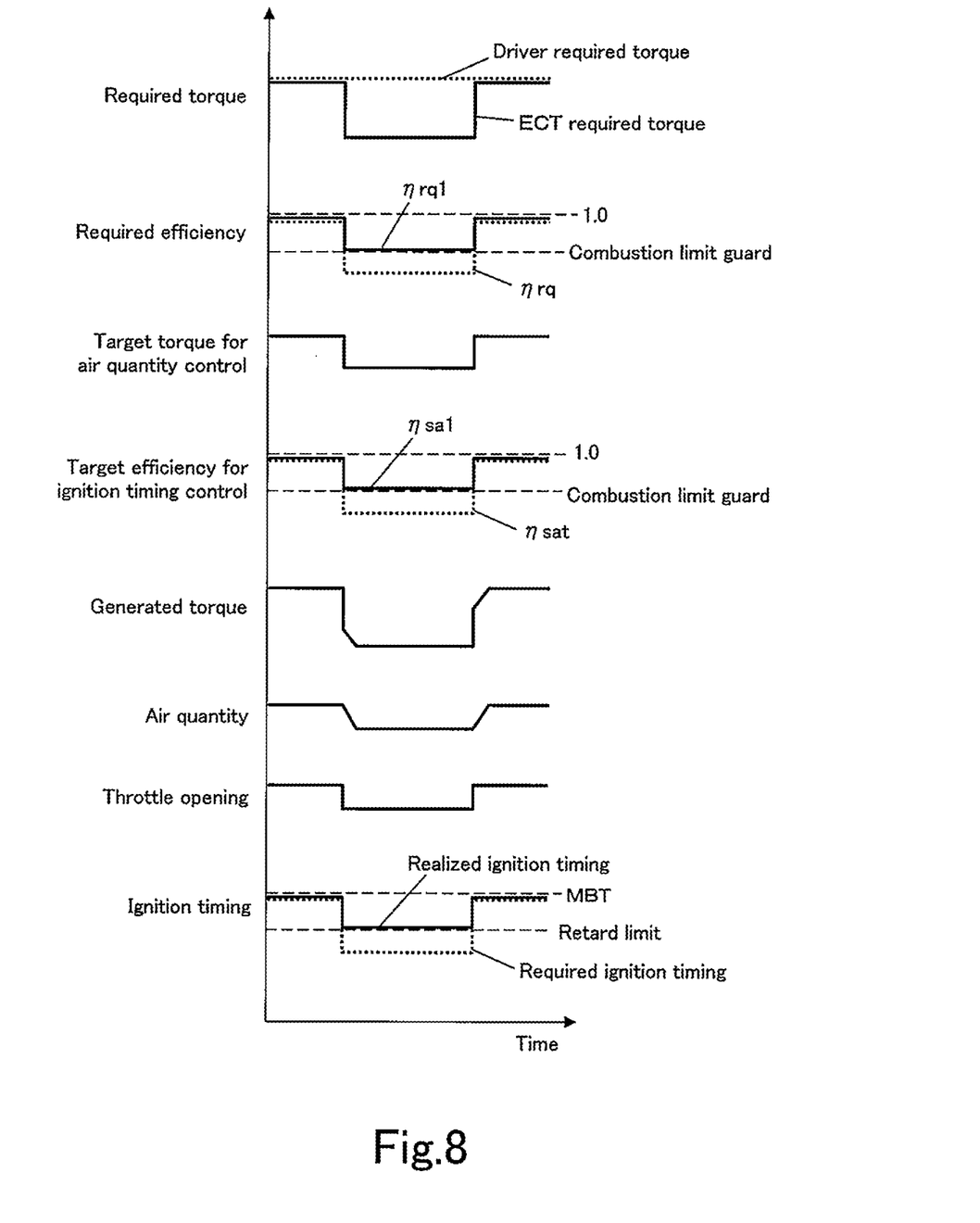
FIG. 8 is a chart showing an operation of the internal combustion engine which is realized by the control device of the configuration shown in FIG. 6.

FIGS. 7 and 8 are charts showing the operations of the internal combustion engine, which are realized by the control device of the configuration shown in FIG. 6. First, the operation shown in FIG. 7 will be described.

In the chart of FIG. 7, the ECT required torque which is one kind of the control device required torque is outputted in addition to the driver required torque. The signal of the ECT required torque is set as a rectangular signal so as to reduce the torque, which is outputted by the internal combustion engine, temporarily and instantly. Further, in agreement with the rectangular signal of the ECT required torque, the rectangular signal of a value smaller than 1 which is a reference value is also outputted in the required efficiency. The signal of the required efficiency which is outputted at this time is regulated so that the value of the air quantity control target torque which is obtained by dividing the required torque by the required efficiency becomes constant.

As a result that such signals of the required torque and the required efficiency are outputted, the air quantity control target torque is kept constant irrespective of change of the required torque. As a result, the throttle opening is not changed in correspondence with the waveform of the ECT required torque, and the cylinder intake air quantity is kept constant. Meanwhile, the target efficiency for ignition timing control which is obtained by dividing the required torque by the estimated torque changes rectangularly in correspondence with the waveform of the ECT required torque. The target efficiency becomes lower than 1 which is the reference value, whereby the ignition timing is retarded from MBT, and in association with this, the generated torque is reduced. The responsiveness of the change of the torque to the change of the ignition timing is high, and therefore, the generated torque shows a rectangular change similar to that of the required torque.

The operation of the control device which is described above is the operation in the case in which the required efficiency and the target efficiency for ignition timing control become the values higher than the combustion limit guard. When they become the values lower than the combustion limit guard, the operation of the control device is as shown in the chart of FIG. 8. Hereinafter, the operation shown in FIG. 8 will be described.

The target efficiency for ignition timing control is calculated based on the required torque. Therefore, when the reduction amount of the ECT required torque included in the required torque is large, the reduction amount of the target efficiency from the reference value also becomes large, and the target efficiency ($\eta sa$) falls below the combustion limit guard. In this case, the target efficiency ($\eta sa1$) which is restricted by the combustion limit guard is used in calculation of the ignition timing, and therefore, the ignition timing is restricted by the retard limit at which optimal combustion can be ensured. When a restriction is placed on the retard amount of the ignition timing as above, the required torque cannot be realized with high efficiency with only the retard of the ignition timing.

However, when the reduction amount of the ECT required torque from the reference value is large, the reduction amount of the required efficiency which is outputted in correspondence with the ECT required torque also becomes large. For calculation of the air quantity control target torque as a result that the required efficiency ($\eta rq$) falls below the combustion limit guard, the required efficiency ($\eta rq1$) which is restricted by the combustion limit guard is used. Therefore, the air control target torque does not become constant, and shows a rectangular change corresponding to the ratio of $\eta rq1$ and $\eta rq$. As a result, the throttle opening is also changed in correspondence with the waveform of the air quantity control target torque, and the cylinder intake air quantity is temporarily reduced. Thereby, the generated torque shows the same change as the required torque. More specifically, according to the operation shown in FIG. 8, the insufficient amount of the torque reduction amount which occurs by the retard amount of the ignition timing being restricted is ensured by decreasing the cylinder intake air quantity by operating the throttle in a closed direction.

As described above, according to the control device of the configuration shown in FIG. 6, the throttle 102 and the ignition device 104 are cooperatively manipulated in accordance with the content of the required torque. Thereby, even when the control device required torque with a high change speed like the ECT required torque is included, the required torque can be realized with high precision.

Incidentally, the aforementioned torque demand control can be applied to control of the internal combustion engines including a turbo supercharger and a mechanical supercharger. However, when the internal combustion engines with superchargers include actuators which actively change a supercharging pressure, for example, a waste gate valve and a variable nozzle, an electric motor which drives a compressor, or the like, manipulation of these actuators needs to be considered. This is because depending on the way of manipulation of these actuators, control precision of the torque is likely to be impaired as will be described as follows.

In the aforementioned torque demand control, the generated torque is controlled by cooperatively controlling the cylinder intake air quantity and the ignition timing, and the cylinder intake air quantity is controlled by the throttle. The flow rate of the air which passes through the throttle is changed by manipulating the throttle and changing the opening thereof, whereby the cylinder intake air quantity can be controlled. However, the throttle passing flow rate also depends on the pressure difference before and after the throttle, and therefore, when the actuators such as a waste gate value and a variable nozzle are present, the cylinder intake air quantity cannot be controlled with high precision unless manipulation of them is not optimal. Accordingly, when the aforementioned torque demand control is applied to an internal combustion engine with a supercharger, it becomes a problem how to manipulate the actuator which actively changes a supercharging pressure and the throttle cooperatively.

CITATION LIST

Patent Literature

Patent Literature 1: Japanese Patent Laid-Open No. 2010-053705
Patent Literature 2: Japanese Patent Laid-Open No. 2004-060479

SUMMARY OF INVENTION

The present invention is made in view of the aforementioned problem, and provides a control device for an internal combustion engine with a supercharger as follows.

A control device provided by the present invention controls an air quantity which an internal combustion engine takes in a cylinder by cooperative manipulation of a throttle and an actuator based on required torque for the internal combustion engine. The actuator mentioned here is an actuator which actively changes a supercharging pressure, and includes a waste gate value and a variable nozzle of a turbo supercharger, an electric motor which drives a compressor or the like. In the present control device, the throttle and the actuator do not share one target air quantity, but a target air quantity for manipulation of the throttle and a target air quantity for manipulation of the actuator are separately determined. Subsequently, a manipulation variable of the throttle is determined in accordance with the target air quantity for throttle manipulation, and a manipulation variable of the actuator is determined in accordance with the target air quantity for actuator manipulation. The target air quantity for throttle manipulation and the target air quantity for actuator manipulation are respectively determined as follows.

The present control device calculates the following two target air quantities based on the required torque. One of them is a reference target air quantity which is normally calculated. Driver required torque which is included in the required torque is converted into an air quantity in accordance with a predetermined conversion rule, and the air quantity which is obtained by the conversion is determined by calculation as a reference target air quantity. The other one is a correction target air quantity which is calculated when a change occurs to the required torque and cannot be realized under the reference target air quantity. The air quantity capable of realizing the change of the required torque in calculation is determined by calculation as the correction target air quantity.

The control device determines the target air quantity for throttle manipulation and the target air quantity for actuator manipulation by using the reference target air quantity and the correction target air quantity. First, in regard with the target air quantity for actuator manipulation, the reference target air quantity is determined as the target air quantity for actuator manipulation irrespective of whether the change of the required torque can be realized under the reference target air quantity. Meanwhile, in regard with the target air quantity for throttle manipulation, the reference target air quantity is normally determined as the target air quantity for throttle manipulation. However, when the required torque cannot be realized under the reference target air quantity, the correction target air quantity is determined as the target air quantity for throttle manipulation in place of the reference target air quantity.

When the actuator which actively changes a supercharging pressure like a waste gate valve and a throttle are compared, response of the cylinder intake air quantity to manipulation is clearly faster in the throttle. This is because a certain time is required before the supercharging pressure changes after the actuator is manipulated. Accordingly, the throttle can change the cylinder intake air quantity to respond to a quick change of the required torque, but in the case of the actuator, the cylinder intake air quantity is changed late behind the change of the required torque. In this regard, according to the present control device, the respective target air quantities for throttle manipulation and for actuator manipulation are determined as described above, whereby the change of the cylinder intake air quantity for responding to a quick change of the required torque is exclusively generated by the operation of the throttle. Meanwhile, the actuator continues to be manipulated at a speed corresponding to the driver required torque at a relatively low change speed, and therefore, the operation of the actuator does not influence the cylinder intake air quantity. In other words, when a sudden change occurs to the required torque, the actuator is manipulated so that the operation thereof does not influence the cylinder intake air quantity. More specifically, according to the present control device, when the required torque changes quickly, more specifically, when the required torque includes control device required torque, the cylinder intake air quantity can be controlled with high precision so as to be able to realize such required torque.

Incidentally, the generated torque of the internal combustion engine can be controlled by not only the cylinder intake air quantity but also ignition timing. In particular, control of the torque by ignition timing is more excellent in responsiveness as compared with control of the torque by the cylinder intake air quantity which is performed by manipulation of the throttle. Accordingly, when the control device required torque is included in the required torque, the ignition timing may be regulated so as to realize a waveform of the control device required torque. Consequently, according to a more preferable mode of the present invention, when a change occurs to the required torque, the present control device regulates the ignition timing so as to realize the change by the change of the ignition timing. However, an allowable regulation range capable of ensuring optimal combustion is present in the ignition timing, and the ignition timing cannot be changed beyond the range. Accordingly, by regulation of the ignition timing within the allowable regulation range, the change amount of the realized torque sometimes becomes insufficient with respect to the change of the required torque. In such a case, the present control device calculates the correction target air quantity so as to ensure the insufficient torque change amount by regulation of the cylinder intake air quantity, and performs manipulation of the throttle with the correction target air quantity set as the target air quantity for throttle manipulation. According to this, while the ignition timing is kept within the range capable of ensuring optimal combustion, the required torque which includes the control device required torque and changes quickly can be realized with high precision.

In a preferable mode of the present invention, for example, a method as follows can be adopted as a method for regulation of the ignition timing. According to the method, the present control device calculates estimated torque which is realized under optimal ignition timing based on a present throttle opening. Subsequently, the present control device calculates a ratio of the required torque to the estimated torque as a target efficiency. When the target efficiency is within a range corresponding to the allowable regulation range of the ignition timing, the present control device determines the ignition timing in accordance with the target efficiency. However, when the target efficiency is outside the range corresponding to the allowable regulation range, the present control device determines the ignition timing in accordance with a limit efficiency corresponding to a limit value of the allowable regulation range.

When the ignition timing is regulated by such a method, the correction target air quantity is preferably calculated by the following methods. According to one of the preferable methods, the present control device divides the required torque by the limit efficiency, and converts the torque which is obtained by the calculation into an air quantity in accordance with the aforementioned conversion rule. Subsequently, the present control device determines, by calculation, the air quantity which is obtained by the conversion as the correction target air quantity. Further, according to another preferable method, the present control device divides the driver required torque by a ratio of the target efficiency and the limit efficiency, and converts torque which is obtained by the calculation into an air quantity in accordance with the aforesaid conversion rule. Subsequently, the present control device determines, by calculation, the air quantity which is obtained by the conversion as the correction target air quantity. According to the calculation methods, a necessary and sufficient correction target air quantity can be accurately calculated so as to change the cylinder intake air quantity by an insufficient amount of a torque change amount due to a restriction of a regulation amount of the ignition timing.

DESCRIPTION OF EMBODIMENTS

Embodiment 1

Embodiment 1 of the present invention will be described with reference to the drawings.

An internal combustion engine with a supercharger (hereinafter, an engine) which is an object to be controlled in each of embodiments of the present invention is a four-cycle reciprocal engine which can control torque by regulation of an air quantity by a throttle. The supercharger which is provided at the engine is a turbo supercharger to which a waste gate vale (hereinafter, WGV) is attached. The WGV which is used here is assumed to be the one that can be actively moved to an optional opening by an E-VRV (Electronic Vacuum. Regulating Valve). The control device controls the torque which is outputted by the engine by performing cooperative manipulation of the WGV, the throttle and the ignition device. As the control variables of the engine, torque and an efficiency are used. The torque mentioned here more strictly means indicated torque. The efficiency in the present description means the ratio of the torque which is actually outputted to the torque which the engine can potentially output.

Figure 1:
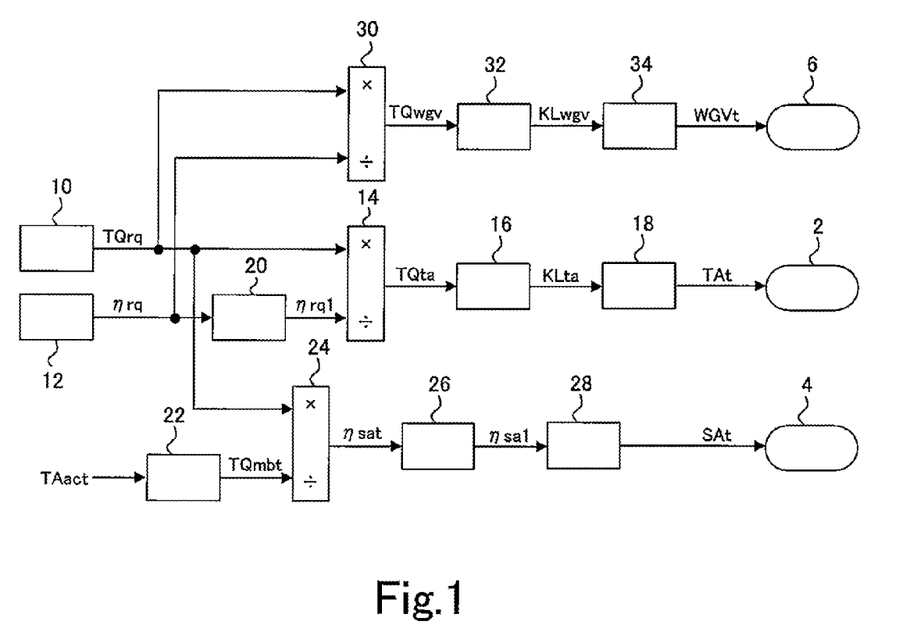
FIG. 1 is a block diagram showing a configuration of a control device for an internal combustion engine with a supercharger of embodiment 1.

A functional block diagram of FIG. 1 shows a configuration of the control device of the present embodiment. Respective elements which configure the control device in FIG. 1 are only the elements relating to each manipulation of a throttle 2, an ignition device 4 and a WGV 6, which are especially expressed in the diagram, among the various functional elements which the control device of the present embodiment has. Accordingly, FIG. 1 does not mean that the control device is configured by only these elements. The respective elements may be individually configured by exclusive hardware, or may be configured virtually by software by sharing hardware. Hereinafter, the configuration of the control device of the present embodiment will be described with the focus on the function of each of the elements shown in FIG. 1.

The torque requirement from a driver which is expressed by a manipulation variable and a manipulation speed of an accelerator pedal is inputted into the control device of the present embodiment. Further, the torque requirements for vehicle control are also inputted from control devices for the vehicle such as an ECT and a TRC. In the following description, in order to facilitate understanding of the feature of the present invention, only the torque requirement from the driver and the torque requirement from the ECT are assumed to be inputted into the control device. The signals of the respective torque requirements which are inputted in the control device are processed in a required torque determining section 10. The required torque determining section 10 determined required torque (TQrq) to the engine based on each torque requirement. The required torque includes driver required torque which is determined based on the torque requirement from the driver, and the ECT required torque which is determined based on the torque requirement from the ECT. In the following description, in order to facilitate understanding of the feature of the present invention, the signal of the driver required torque is assumed to be a flat signal without a variation, and the signal of the ECT required torque is assumed to be a rectangular signal so as to reduce the torque which is outputted by the engine temporarily and instantly.

The required value of the efficiency which is another control variable is determined in a required efficiency determining section 12. The required efficiency determining section 12 determines the value of a required efficiency ($\eta rq$) by being linked with the required torque which is determined in the required torque determining section 10. More specifically, when the required torque includes only the driver required torque, the required efficiency determining section 12 determines the required efficiency to be 1 which is the maximum value thereof. However, when the required torque includes the ECT required torque, the required efficiency determining section 12 changes the value of the required efficiency to a value smaller than 1 which is the reference value in correspondence with the rectangular signal of the ECT required torque. In more detail, the value of the required efficiency is changed so that the value which is obtained by dividing the required torque by the required efficiency becomes constant before and after the change of the ECT required torque.

The control device of the present embodiment includes a target torque calculating section 14, a target air quantity calculating section 16, a throttle opening calculating section 18 and a combustion ensuring section 20 as the elements for determining the manipulation variable of the throttle 2. Meanwhile, as the elements for determining the manipulation variable of the WGV 6, the control device includes a target torque calculating section 30, a target air quantity calculating section 32 and a WGV opening calculating section 34. The difference in feature between both of them is presence and absence of guard processing of the required efficiency by the combustion ensuring section 20. The combustion ensuring section 20 sets the lower limit value of the efficiency which can ensure optimal combustion as the combustion limit guard value. When the required efficiency ($\eta rq$) which is inputted from the required efficiency determining section 12 is larger than the combustion limit guard value, the combustion ensuring section 20 outputs the inputted required efficiency ($\eta rq$) directly as a required efficiency ($\eta rq1$) with which combustion is ensured. However, when the required efficiency ($\eta rq$) is the combustion limit guard value or less, the combustion limit guard value which is the lower limit value of the required efficiency is outputted as the required efficiency ($\eta rq1$) with which combustion is ensured. In the target torque calculating section 14 for throttle manipulation, the required efficiency ($\eta rq1$) with combustion ensured in the combustion ensuring section 20 is inputted. Meanwhile, in the target torque calculating section 30 for WGV manipulation, the required efficiency (ηrq) which is determined in the required efficiency determining section 12 is directly inputted.

The target torque calculating section 14 for throttle manipulation calculates target torque (TQta) for throttle manipulation by dividing the required torque (TQrq) by the required efficiency (ηrq1) after regulation. The target torque for throttle manipulation is inputted in the target air quantity calculating section 16. The target air quantity calculating section 16 converts the target torque for throttle manipulation into an air quantity by using a torque-air quantity conversion map. The torque-air quantity conversion map is a map in which on the precondition that the ignition timing is optimal ignition timing (ignition timing which is closer to the retard side out of MBT and trace knock ignition timing), torque and an air quantity are linked with each other with various engine state variables including an engine speed and an air-fuel ratio as a key. The air quantity which is obtained by the conversion is a "reference target air quantity" corresponding to the driver required torque when the required efficiency (ηrq) is larger than the combustion limit guard value, and is a "correction target air quantity" for realizing a change of the required torque when the required efficiency (ηrq) is the combustion limit guard value or lower. The target air quantity calculating section 16 determines the air quantity which is obtained by the conversion as a target air quantity (KLta) for throttle manipulation. The target air quantity for throttle manipulation is inputted in the throttle opening calculating section 18. The throttle opening calculating section 18 calculates a target throttle opening (TAt) for achieving the target air quantity for throttle manipulation by using an air inverse model. The air inverse model is an inverse model of a physical model which is obtained by modeling the responsiveness of the cylinder intake air quantity to the operation of the throttle 2. The control device manipulates the throttle 2 with the target throttle opening (TAt) which is obtained as above as the manipulation variable.

Meanwhile, the target torque calculating section 30 for WGV manipulation calculates target torque (TQwgv) for WGV manipulation by dividing the required torque (TQrq) by the unprocessed required efficiency (ηrq) without regulation. The target torque for WGV manipulation is inputted in the target air quantity calculating section 32. The target air quantity calculating section 32 converts the target torque for WGV manipulation into an air quantity by using the aforementioned torque-air quantity conversion map. The air quantity which is obtained by the conversion is a "reference target air quantity" corresponding to the driver required torque, and is determined as a target air quantity (KLwgv) for WGV manipulation. The target air quantity for WGV manipulation is inputted in the WGV opening calculating section 34. The WGV opening calculating section 34 converts the target air quantity for WGV manipulation into a target supercharging pressure by using a map in which a supercharging pressure is linked with an air quantity. Subsequently, the WGV opening calculating section 34 calculates a target WGV opening (WGVt) for achieving the target supercharging pressure by using an inverse model of a turbo supercharger. The control device manipulates the WGV 6 with the target WGV opening (WGVt) which is obtained as above as the manipulation variable.

In parallel with the above processing, the control device executes processing for determining the manipulation variable of the ignition device 4. An estimated torque calculating section 22, a target efficiency calculating section 24, a combustion ensuring section 26 and an ignition timing calculating section 28 are elements for determining ignition timing which is the manipulation variable of the ignition device 4. The combustion ensuring section 26 for target efficiency among them is the element for regulating the efficiency of the engine within a range capable of ensuring optimal combustion similarly to the combustion ensuring section 20 for the required efficiency. The combustion ensuring section 26 for the target efficiency has the combustion limit guard value which is the same value as that of the combustion ensuring section 20 for the required efficiency.

The estimated torque calculating section 22 estimates the cylinder intake air quantity based on a present throttle opening (TAact), and calculates estimated torque (TQmbt) under the optimal ignition timing based on the estimated cylinder intake air quantity. The target efficiency calculating section 24 calculates a ratio of the required torque (ηrq) which is determined in the required torque determining section 10 to the estimated torque as a target efficiency (ηsa) for ignition timing control. The target efficiency (ηsa) is inputted in the combustion ensuring section 26, and a target efficiency (ηsa1) which is regulated in the combustion ensuring section 26 is inputted in the ignition timing calculating section 28. At this time, when the target efficiency (ηsa) is larger than the combustion limit guard value, the combustion ensuring section 26 outputs the inputted target efficiency (ηsa) directly as the target efficiency (ηsa1) with combustion ensured. However, when the target efficiency (ηsa) is the combustion limit guard value or less, the combustion ensuring section 26 outputs the combustion limit guard value which is the lower limit value of the target efficiency as the target efficiency (ηsa1) with combustion ensured. The ignition timing calculating section 28 calculates target ignition timing (SAt) based on the target efficiency with combustion ensured. When the value of the target efficiency is 1, the target ignition timing is set to the optimal ignition timing, and as the value of the target efficiency is smaller than 1, the target ignition timing is more retarded from the optimal ignition timing. The control device manipulates the ignition device 4 with the target ignition timing (SAt) which is obtained as above as the manipulation variable.

According to the control device of the present embodiment which is configured as above, the effect which is not conventionally obtained can be obtained in torque control of a supercharged engine. Hereinafter, the effect in torque control which is obtained by the control device of the present embodiment will be made clear by putting the control device of the present embodiment in contrast with a comparative control device.

Figure 2:
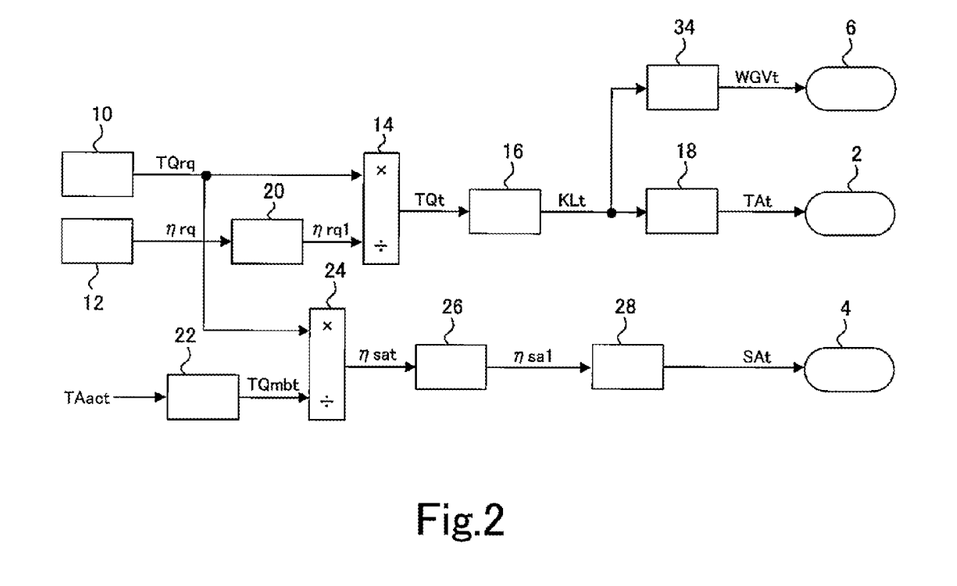
FIG. 2 is a block diagram showing a configuration of a comparative control device with respect to the control device of the configuration shown in FIG. 1.

A functional block diagram of FIG. 2 shows a configuration of the comparative control device with respect to the control device of the present embodiment. The configuration of the comparative control device shown in FIG. 2 is the configuration which a person skilled in the art could relatively easily conceive of when the conventional control device shown in FIG. 6 is applied to the control device of a supercharged engine with a WGV. In the configuration shown in FIG. 2, the elements which have the functions common to the elements shown in FIG. 1 are assigned with the same reference numerals as those of the elements shown in FIG. 1. As is obvious when FIGS. 1 and 2 are compared, the difference between the control device of the present embodiment and the comparative control device is the target air quantity which is used in calculation of the target WGV opening (WGVt) in the WGV opening calculating section 34. In the comparative control device, a common target air quantity (KLt) is used for calculation of the target throttle opening and for calculation of the target WGV opening. Since the throttle 2 and the WGV 6 are both actuators which control the cylinder intake air quantity, using the target air quantity common to the throttle 2 and the WGV 6 as in the comparative control device can be said as a natural selection to a person skilled in the art. However, in the control device of the present embodiment, the throttle 2 and the WGV 6 do not share one target air quantity, but the target air quantity (KLta) for calculation of the target throttle opening and the target air quantity (KLwgv) for calculation of the target WGV opening are separately determined as described above.

Figure 3:
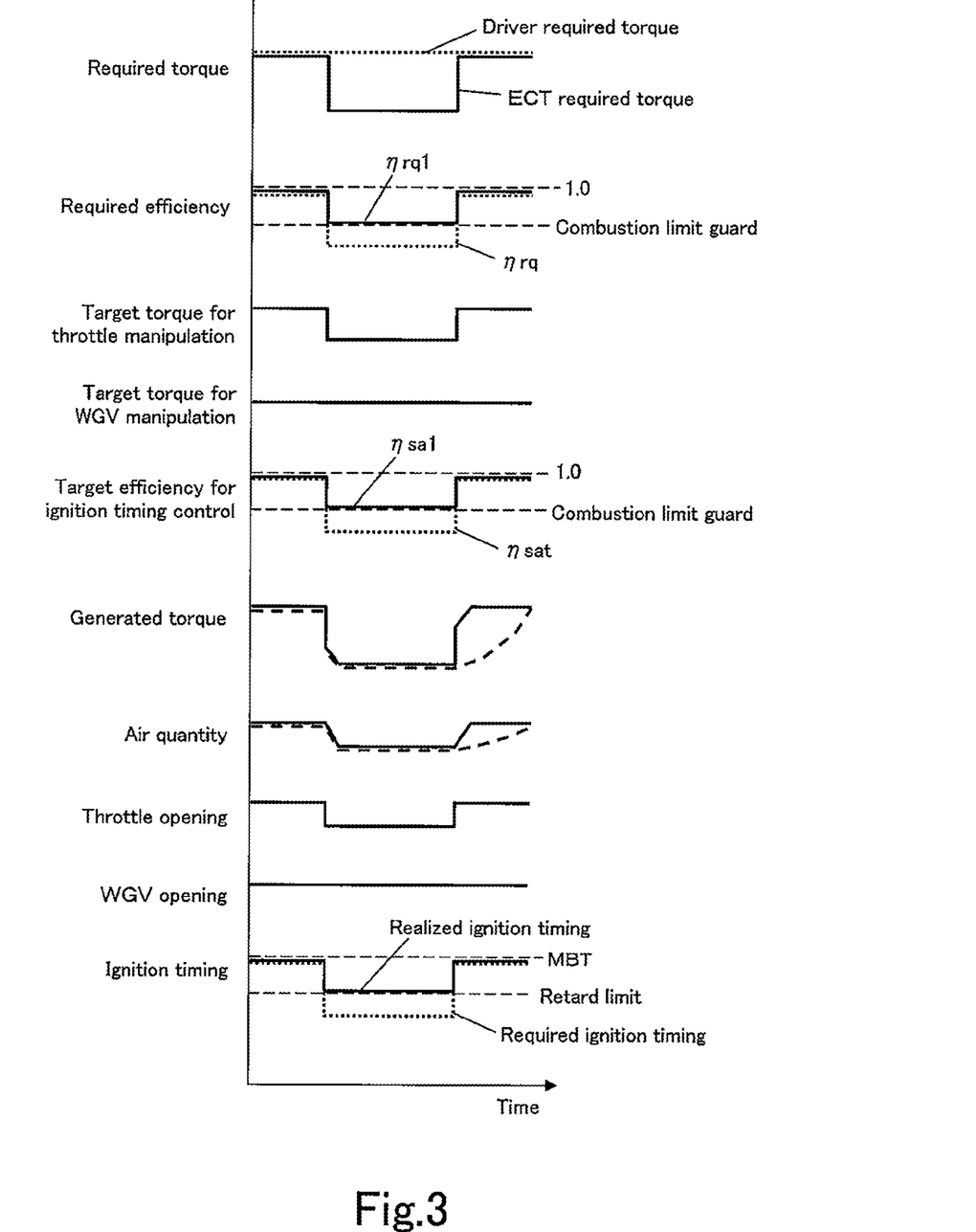
FIG. 3 is a chart showing an operation of an internal combustion engine with a supercharger which is realized by the control device of the configuration shown in FIG. 1.

According to the control device of the present embodiment, when the required torque includes the ETC required torque, the supercharged engine which is an object to be controlled operates as shown in a chart of FIG. 3. Meanwhile, according to the comparative control device, the supercharged engine which is an object to be controlled operates as shown in a chart of FIG. 4. First, the operation of the supercharged engine which is realized by the comparative control device will be explained, and, while being compared with this, an operation of the supercharged engine which is realized by the control device of the present embodiment will be explained next. As the matter common to the comparative control device and the control device of the present embodiment, the required efficiency ($\eta$rq) which is below the combustion limit guard value is assumed to be outputted from the required efficiency determining section 12 in response to the ECT required torque. In this case, the target efficiency ($\eta$sa) for ignition timing control which is calculated based on the required torque also falls below the combustion limit guard value, and therefore, the target efficiency ($\eta$sa1) with combustion ensured is used in calculation of the ignition timing. As a result, in each of the comparative control device and the control device of the present embodiment, the ignition timing is restricted by the retard limit capable of ensuring optimal combustion.

Figure 4:
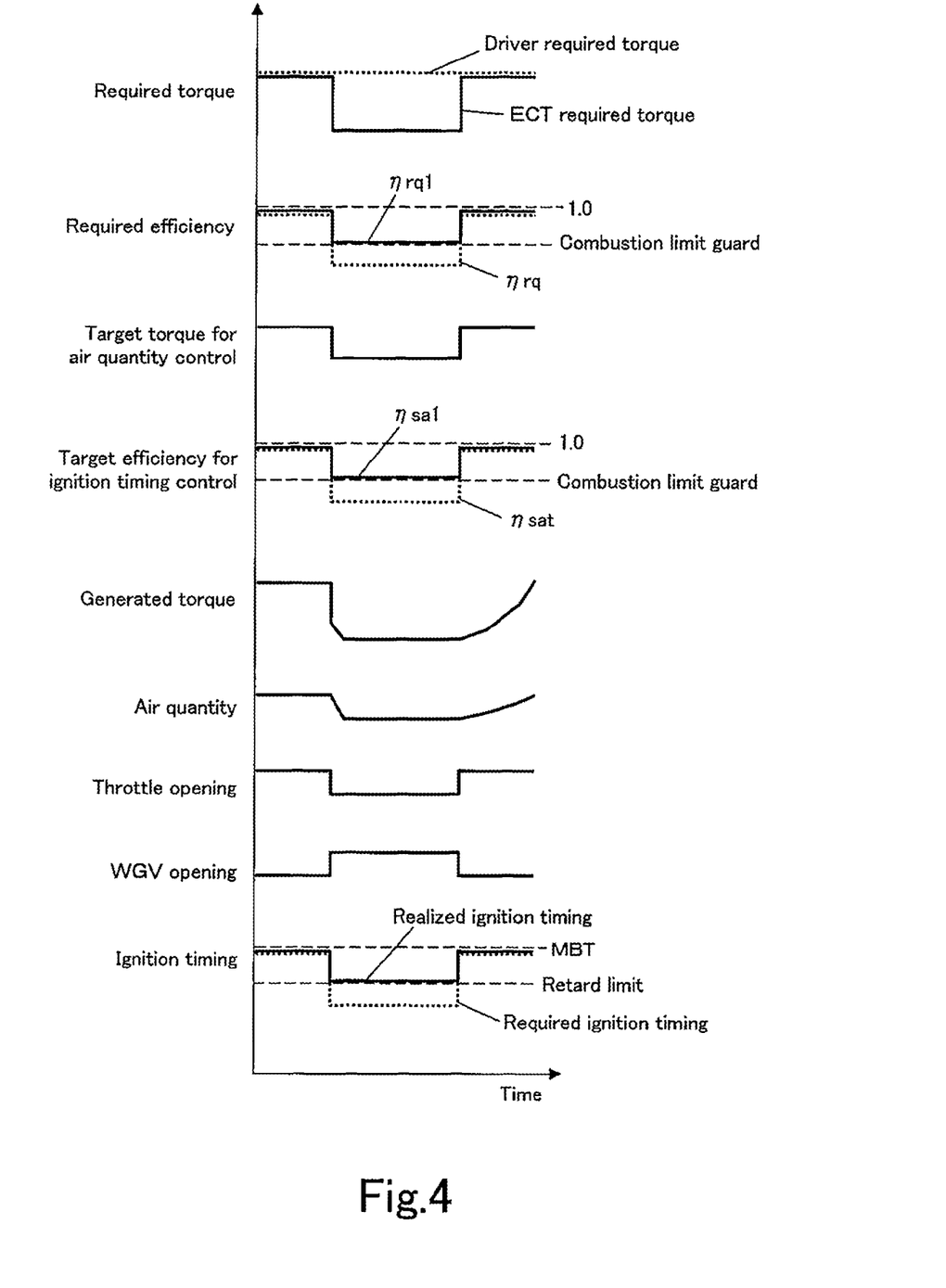
FIG. 4 is a chart showing an operation of an internal combustion engine with a supercharger which is realized by the control device of the configuration shown in FIG. 2.

In the case of comparative control device, the target torque for air quantity control is calculated by using the required efficiency ($\eta$rq1) which is restricted by the combustion limit guard value. The air quantity control target torque shows a rectangular change corresponding to the ratio of the original required efficiency ($\eta$rq) and the required efficiency ($\eta$rq1) with combustion ensured. Subsequently, the air quantity control target torque is converted into the air quantity, and with this set as the common target air quantity, the target throttle opening and the target WGV opening are calculated. As a result, the throttle is manipulated so that the throttle opening shows a rectangular change in correspondence with the waveform of the air quantity control target torque. Similarly, the WGV is manipulated so that the WGV opening shows a rectangular change in correspondence with the waveform of the air quantity control target torque. The throttle and the WGV are manipulated as above, whereby the cylinder intake air quantity is temporarily reduced.

However, as shown in the chart of FIG. 4, the actual cylinder intake air quantity does not change as the air quantity control target torque. This is due to the response delay of the supercharging pressure to manipulation of the WGV, that is, a turbo lag. The cylinder intake air quantity is determined by the flow rate of the air which passes through the throttle, and the parameters which determine the throttle passing flow rate are the throttle opening and the supercharging pressure. Abrupt reduction of the cylinder intake air quantity by changing the throttle passing flow rate can be achieved by reducing the throttle opening though a little response delay occurs. However, increasing the cylinder intake air quantity by changing the throttle passing flow rate cannot be achieved in the situation in which the supercharging pressure is insufficient due to a turbo lag. Therefore, as shown in the chart of FIG. 4, a clear response delay occurs to a rise in the air quantity control target torque at the rise after the cylinder intake air quantity temporarily reduces. The final generated torque of a supercharged engine is determined by the cylinder intake air quantity and the ignition timing, and therefore, as a result that a delay occurs to the rise of the cylinder intake air quantity, a delay also occurs to the rise of the generated torque. More specifically, it is difficult to realize the waveform of the ECT required torque included in the required torque in the generated torque, in the configuration of the comparative control device.

In the case of the control device of the present embodiment, the target torque for throttle manipulation is calculated by using the required efficiency ($\eta$rq1) restricted by the combustion limit guard value, and at the same time, the target torque for WGV manipulation is calculated by using the required efficiency ($\eta$rq) which is not restricted. The throttle manipulation target torque shows a rectangular change corresponding to the ratio of the original required efficiency ($\eta$rq1) and the required efficiency ($\eta$rq1) with combustion ensured. Subsequently, the throttle manipulation target torque is converted into the air quantity, and with this set as the target air quantity, the target throttle opening is calculated. Meanwhile, the WGV manipulation target torque is obtained by dividing the required torque by the required efficiency ($\eta$rq) corresponding to the required torque, and therefore, has a flat signal corresponding to the driver required torque included in the required torque. Subsequently, the WGV manipulation target torque is converted into the air quantity, and with this used as the target air quantity, the target WGV opening is calculated. As a result, the throttle is manipulated so that the throttle opening shows a rectangular change in correspondence with the waveform of the throttle manipulation target torque. However, the WGV is manipulated so as to have a constant WGV opening in correspondence with the flat signal of the WGV manipulation target torque.

The chart of FIG. 3 shows the changes of the air quantity and the generated torque which are realized by the control device of the present embodiment by solid lines, and shows the changes of the air quantity and the generated torque which are realized by the comparative control device by the broken lines. According to the control device of the present embodiment, the WGV is kept at the opening corresponding to the driver required torque, and therefore, the supercharge pressure is kept at a high state even when the ECT required torque changes in the rectangular shape. Accordingly, when the opening manipulation of the throttle is performed in response to the rise of the ECT required torque, insufficiency of the supercharging pressure does not occur, and therefore, the cylinder intake air quantity quickly increases in response to the opening manipulation of the throttle. More specifically, according to the control device of the present embodiment, as is obvious by being put in contrast with the comparative control device, the control device can control the cylinder intake air quantity with high precision in response to a quick change of the required torque. Thereby, according to the control device of the present embodiment, torque insufficiency does not occur, and the waveform of the ECT required torque included in the required torque can be substantially accurately realized in the generated torque.

Embodiment 2

Next, embodiment 2 of the present invention will be described with reference to the drawings.

Figure 5:
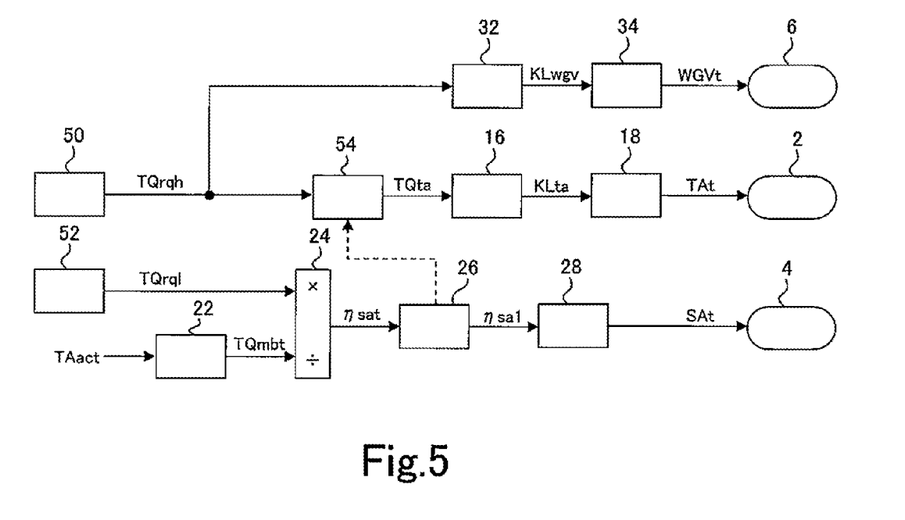
FIG. 5 is a block diagram showing a configuration of a control device of an internal combustion engine with a supercharger of embodiment 2 of the present invention.

FIG. 5 is a functional block diagram which shows a configuration of a control device of the present embodiment. In the configuration shown in FIG. 5, the elements having the functions common to the elements of the control device of embodiment 1 shown in FIG. 1 are assigned with the same reference numerals as those of the elements shown in FIG. 1. Hereinafter, the configuration of the control device of the present embodiment will be described with a focus on the difference from the control device of embodiment 1.

The difference from the control device of embodiment 1 lies in the respect that the control device of the present embodiment uses only torque as the control variable of the engine. More specifically, a required efficiency is not used as the control device of embodiment 1. However, in the control device of embodiment 1, the combination of the driver required torque and the ECT required torque is outputted as the required torque, whereas in the control device of the present embodiment, driver required torque and ECT required torque are separately outputted without being combined. According to the configuration shown in FIG. 5, driver required torque (TQrg1) is outputted from a driver required torque determining section 50, and ECT required torque (TQrgh) is outputted from an ECT required torque determining section 52.

The control device of the present embodiment uses the ECT required torque (TQrgh) in determination of the manipulation variable of the ignition device 4, and the driver required torque (TQrg1) in determination of the respective manipulation variables of the throttle 2 and the WGV 6. First, processing for determination of the manipulation variable of the ignition device 4, that is, ignition timing, which is performed in the control device of the present embodiment will be described. According to the configuration shown in FIG. 5, the ECT required torque (TQrgh) is inputted in the target efficiency calculating section 24 together with the estimated torque (TQmbt) which is calculated in the estimated torque calculating section 22. The target efficiency calculating section 24 calculates a ratio of the ECT required torque to the estimated torque as the target efficiency ($\eta$sa) for ignition timing control. The target efficiency ($\eta$sa) is inputted in the combustion ensuring section 26, and the target efficiency ($\eta$sa1) with combustion ensured in the combustion ensuring section 26 is inputted in the ignition timing calculating section 28. The ignition timing calculating section 28 calculates the target ignition timing (SAt) based on the target efficiency with combustion ensured. The control device manipulates the ignition device 4 with the target ignition timing (SAt) which is obtained as above as the manipulation variable.

The control device of the present embodiment uses the driver required torque (TQrg1) in determination of each of the manipulation variables of the throttle 2 and the WGV 6. However, as in the control device of embodiment 1, the control device of the present embodiment determines the target air quantity (KLta) for calculation of the target throttle opening and the target air quantity (KLwgv) for calculation of the target WGV opening separately.

Determination of the target air quantity (KLwgv) for WGV manipulation is performed in the target air quantity calculating section 32. The driver required torque (TQrg1) which is determined in the driver required torque determining section 50 is directly inputted in the target air quantity calculating section 32. The WGV manipulation target torque which is used in calculation of the WGV manipulation target air quantity in embodiment 1 is substantially the same as the driver required torque. The target air quantity calculating section 32 converts the driver required torque into the target air quantity (KLwgv) for WGV manipulation by using the torque-air quantity conversion map. The target air quantity for WGV manipulation is inputted in the WGV opening calculating section 34. The WGV opening calculating section 34 calculates the target WGV opening (WGVt) based on the target air quantity for WGV manipulation. The control device manipulates the WGV 6 with the target WGV opening (WGVt) which is obtained as above as the manipulation variable.

Determination of the target air quantity (KLta) for throttle manipulation is performed in the target air quantity calculating section 16. The throttle manipulation target torque (TQta) is inputted in the target air quantity calculating section 16 from a combustion ensuring section 54. As will be described later, the combustion ensuring section 54 generates the throttle manipulation target torque (TQta) from the driver required torque (TQrg1). The target air quantity calculating section 16 converts the throttle manipulation target torque into the target air quantity (KLta) for throttle manipulation by using the torque-air quantity conversion map. The target air quantity (KLta) for throttle manipulation is inputted in the throttle opening calculating section 18. The throttle opening calculating section 18 calculates the target throttle opening (TAt) from the throttle manipulation target air quantity by using the air inverse model. The control device manipulates the throttle 2 with the target throttle opening (TAt) which is obtained as above as the manipulation variable.

Generation of the throttle manipulation target torque in the combustion ensuring section 54 is performed as follows. First, the target efficiency ($\eta$sa) which is outputted from the target efficiency calculating section 24 and the combustion limit guard value of the combustion ensuring section 26 are supplied to the combustion ensuring section 54 as information. The combustion ensuring section 54 compares the target efficiency and the combustion limit guard value which are supplied. When the target efficiency is larger than the combustion limit guard value, that is, when a restriction is not placed on the target efficiency in the combustion ensuring section 26, the combustion ensuring section 54 outputs the driver required torque (TQrg1) directly as the throttle manipulation target torque (TQta). However, when the target efficiency is the combustion limit guard value or less, that is, when the target efficiency is restricted by the combustion limit guard value in the combustion ensuring section 26, the driver required torque (TQrg1) is divided by the ratio of the target efficiency and the combustion limit guard value, and the torque which is obtained by the calculation is outputted as the throttle manipulation target torque (TQta). The throttle manipulation target torque which is calculated as above is substantially the same as the throttle manipulation target torque which is calculated in embodiment 1.

According to the control device of the present embodiment which is configured as above, the supercharged engine which is an object to be controlled can be caused to realize substantially the same operation as that realized by the control device of embodiment 1. More specifically, according to the control device of the present embodiment, the same effect as that obtained by the control device of embodiment 1 can be obtained in torque control of a supercharged engine.

Others

The embodiments of the present invention are described above, but the present invention is not limited to the aforementioned embodiments, and can be carried out by being variously modified within the range without departing from the gist of the present invention. In the aforementioned embodiments, the present invention is applied to the engine including a turbo supercharger with a WGV, but the WGV is one example of an actuator which changes a supercharging pressure. The control device provided by the present invention can be applied to any supercharged engine having an actuator which actively changes a supercharging pressure, such as an engine including a turbo supercharger with a variable nozzle, and an engine including a supercharger with an electric motor which drives a compressor or assisting the compressor with rotation thereof.

DESCRIPTION OF REFERENCE NUMERALS

2 Throttle
4 Ignition device
6 Waste gate valve
10 Required torque determining section
12 Required efficiency determining section
14 Target torque calculating section for throttle manipulation
16 Target air quantity calculating section for throttle manipulation
18 Throttle opening calculating section
20 Combustion ensuring section for required efficiency
22 Estimated torque calculating section
24 Target efficiency calculating section for ignition timing control
26 Combustion ensuring section for target efficiency
28 Ignition timing calculating section
30 Target torque calculating section for WGV manipulation
32 Target air quantity calculating section for WGV manipulation
34 WGV opening calculating section
50 Driver required torque determining section
52 ECT required torque determining section
54 Combustion ensuring section for required torque

The invention claimed is:

1. A control device for an internal combustion engine with a supercharger having an actuator which actively changes a supercharging pressure, the control device controlling an air quantity which the internal combustion engine takes in a cylinder by cooperative manipulation of a throttle and the actuator based on required torque for the internal combustion engine, the control device comprising:
   target air quantity determining means that separately determines a target air quantity for manipulation of the throttle, and a target air quantity for manipulation of the actuator;
   throttle manipulation variable determining means that determines a manipulation variable of the throttle in accordance with the target air quantity for throttle manipulation; and
   actuator manipulation variable determining means that determines a manipulation variable of the actuator in accordance with the target air quantity for actuator manipulation,
   wherein the target air quantity determining means comprises
   reference target air quantity calculating means that converts driver required torque which is included in the required torque into an air quantity in accordance with a predetermined conversion rule, and calculates the air quantity which is obtained by the conversion as a reference target air quantity,
   correction target air quantity calculating means that, when a change occurs to the required torque and cannot be realized under the reference target air quantity, calculates a correction target air quantity capable of realizing the change,
   actuator manipulation target air quantity determining means that determines the reference target air quantity as the target air quantity for actuator manipulation, and
   throttle manipulation target air quantity determining means that normally determines the reference target air quantity as the target air quantity for throttle manipulation, and determines the correction target air quantity as the target air quantity for throttle manipulation when the required torque cannot be realized under the reference target air quantity.

2. The control device for an internal combustion engine with a supercharger according to claim 1, further comprising ignition timing regulating means that, when a change occurs to the required torque, regulates ignition timing within an allowable regulation range to realize the change by change of the ignition timing,
   wherein the correction target air quantity calculating means calculates the correction target air quantity to compensate an insufficient torque change amount by regulation of a cylinder intake air quantity when a change amount of realized torque is insufficient with respect to the change of the required torque by regulation of the ignition timing within the allowable regulation range.

3. The control device for an internal combustion engine with a supercharger according to claim 2,
   wherein the ignition timing regulating means comprises
   estimated torque calculating means that calculates estimated torque which is realized under optimal ignition timing based on a present throttle opening,
   target efficiency calculating means that calculates a ratio of the required torque to the estimated torque as a target efficiency, and
   ignition timing determining means that determines ignition timing in accordance with the target efficiency when the target efficiency is within a range corresponding to the allowable regulation range, and determines the ignition timing in accordance with a limit efficiency corresponding to a limit value of the allowable regulation range when the target efficiency is outside the range corresponding to the allowable regulation range.

4. The control device for an internal combustion engine with a supercharger according to claim 3,
   wherein the correction target air quantity calculating means converts torque which is obtained by dividing the required torque by the limit efficiency into an air quantity in accordance with the conversion rule, and determines, by calculation, the air quantity obtained by the conversion as the correction target air quantity.

5. The control device for an internal combustion engine with a supercharger according to claim 3,
   wherein the correction target air quantity calculating means converts torque which is obtained by dividing the driver required torque by a ratio of the target efficiency and the limit efficiency into an air quantity in accordance with the conversion rule, and determines, by calculation, the air amount obtained by the conversion as the correction target air quantity.

6. A control device for an internal combustion engine with a supercharger having an actuator which actively changes a supercharging pressure, the control device controlling an air quantity which the internal combustion engine takes in a cylinder by cooperative manipulation of a throttle and the actuator based on required torque for the internal combustion engine, the control device comprising:
   a computer that separately determines a target air quantity for manipulation of the throttle, and a target air quantity for manipulation of the actuator;
   a first manipulator that manipulates the throttle in accordance with the target air quantity for throttle manipulation a second manipulator that manipulates the actuator in accordance with the target air quantity for actuator manipulation, wherein the computer is programmed to:

convert driver required torque which is included in the required torque into an air quantity in accordance with a predetermined conversion rule;

calculate the air quantity which is obtained by the conversion as a reference target air quantity;

when a change occurs to the required torque and cannot be realized under the reference target air quantity, calculate a correction target air quantity capable of realizing the change;

determine the reference target air quantity as the target air quantity for actuator manipulation;

normally determine the reference target air quantity as the target air quantity for throttle manipulation; and determine the correction target air quantity as the target air quantity for throttle manipulation when the required torque cannot be realized under the reference target air quantity.

7. The control device for an internal combustion engine with a supercharger according to claim 6, further comprising a ignition timing regulator that, when a change occurs to the required torque, regulates ignition timing within an allowable regulation range to realize the change by change of the ignition timing, wherein the computer is further programmed to calculate the correction target air quantity to compensate an insufficient torque change amount by regulation of a cylinder intake air quantity when a change amount of realized torque is insufficient with respect to the change of the required torque by regulation of the ignition timing within the allowable regulation range.

8. The control device for an internal combustion engine with a supercharger according to claim 7, wherein the ignition timing regulator is programmed to:

calculate estimated torque which is realized under optimal ignition timing based on a present throttle opening;

calculate a ratio of the required torque to the estimated torque as a target efficiency;

determine ignition timing in accordance with the target efficiency when the target efficiency is within a range corresponding to the allowable regulation range; and determine the ignition timing in accordance with a limit efficiency corresponding to a limit value of the allowable regulation range when the target efficiency is outside the range corresponding to the allowable regulation range.

9. The control device for an internal combustion engine with a supercharger according to claim 8, wherein the computer is further programmed to convert torque which is obtained by dividing the required torque by the limit efficiency into an air quantity in accordance with the conversion rule, and determine, by calculation, the air quantity obtained by the conversion as the correction target air quantity.

10. The control device for an internal combustion engine with a supercharger according to claim 8, wherein the computer is further programmed to convert torque which is obtained by dividing the driver required torque by a ratio of the target efficiency and the limit efficiency into an air quantity in accordance with the conversion rule, and determine, by calculation, the air amount obtained by the conversion as the correction target air quantity.

* * * * *